Oct. 23, 1962  D. S. LITTLE ET AL  3,059,477
LANDING INDICATOR
Filed July 20, 1959  3 Sheets-Sheet 1

INVENTORS
DAVID S. LITTLE
EDWARD W. PIKE
BY FREDERICK C. MELCHIOR

ATTORNEYS

Oct. 23, 1962 D. S. LITTLE ET AL 3,059,477
LANDING INDICATOR
Filed July 20, 1959 3 Sheets-Sheet 2

INVENTORS
DAVID S. LITTLE
EDWARD W. PIKE
FREDERICK C. MELCHIOR
BY
Emery Whittemore Sandoe & Graham
ATTORNEYS Oct. 23, 1962  D. S. LITTLE ET AL  3,059,477
LANDING INDICATOR
Filed July 20, 1959  3 Sheets-Sheet 3
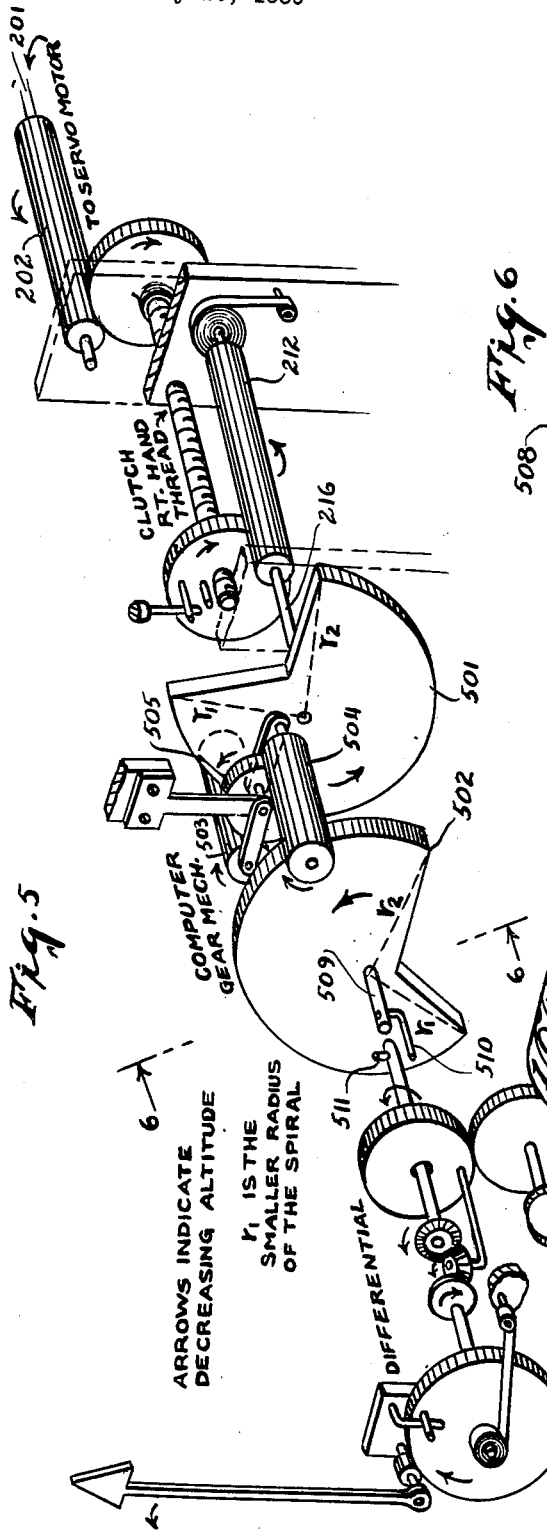
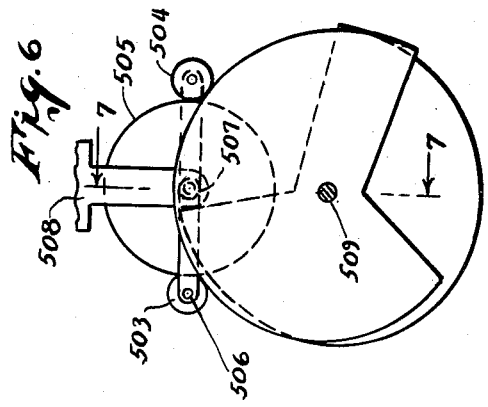
INVENTORS
DAVID S. LITTLE
EDWARD W. PIKE
BY FREDERICK C. MELCHIOR
ATTORNEYS 3,059,477
LANDING INDICATOR
David S. Little, 35 Bogart Ave., Port Washington, N.Y.;
Edward W. Pike, 7 St. Nicholas Drive, Twickenham,
England; and Frederick C. Melchior, 258 Riverside
Drive, New York, N.Y.
Filed July 20, 1959, Ser. No. 828,158
7 Claims. (Cl. 73—387)

This invention relates to barometric altimeters and, more particularly, relates to an altimeter presenting an easily recognizable and unambiguous indication of altitude above the airport runway during landing approach.

The increased complexity of modern aircraft has increased the burden on the pilot, particularly during the critical flight period of aircraft landing approach. Unfortunately, the pilot is required to direct a considerable amount of his attention to operating tasks within the cockpit during the flare and touchdown stages of landing, and, in particular, attention must be directed to close and virtually continuous scanning of instruments to control aircraft approach. The pilot must also look outside of the cockpit, particularly during conditions of restricted visibility in which the time for accomplishing corrective maneuvers between ceiling breakthrough and touchdown is extremely short. Thus, the pilot must alternately scan a multitude of instruments and look outside the cockpit. Therefore, time becomes of the essence and the instrument display must be such as to convey the requisite information in the shortest observation time.

Of prime importance to the pilot during letdown, particularly during letdown under adverse weather conditions such as a low ceiling, is the altitude of the aircraft above the runway. While an aircraft altimeter having the necessary sensitivity and accuracy for approach altitude measurement has been disclosed to the art in articles such as, "New Altimeter May Ease Problem of High Altitude Traffic Control," December 5, 1955, issue of Aviation Week, McGraw-Hill; and the Institute of Aeronautical Sciences report, No. 59-84, the aircraft altimeter is provided with a numerical scale for altitude display over the altimeter range. Although a numerical scale provides unambiguous display, recognition of the altitude requires a predetermined observation time interval (which varies with the pilot). Further, to conform with flight control convention, the scale presentation is altitude above a reference altitude. Thus, the pilot must continuously compute the altitude above the runway by subtraction of the airport altitude from the aircraft altitude above the same reference level. While such computation is admittedly simple under desk conditions, it is a time consuming distraction and a source of error under conditions of aircraft landing approach.

It is, therefore, one object of this invention to provide an indicator reading altitude above the runway.

It is a further object of this invention to provide an altimeter which will present an unambiguous and easily recognizable indication of aircraft altitude above a runway.

It is another object of this invention to provide an indicator for indicating the vertical closing distance between an aircraft and an air field during a selected critical range by a single revolution pointer.

It is another object of this invention to provide an indicator for indication of altitude during letdown which may be combined with a pressure altimeter and which is operative only over a critical closing range during letdown.

It is a further object of this invention to provide an improved altimeter display for operation during aircraft landing approach which will indicate altitude above the airport runway over a settable range of airport elevations and ambient barometric pressures at the airport.

In accordance with these objects, there is provided, in a preferred embodiment of this invention, a single rotation pointer rotatably driven through said single rotation in accordance with altitude of the aircraft above an airport runway. An aneroid sensor, the output of which is proportional to barometric pressure, is employed as the indicator sensor. The sensor output is coupled to the input of a computor, the output of which is a logarithmic function of the input, through a clutch which couples the sensor to the computor only when the aircraft is within a first predetermined altitude range above a reference level.

The computor output is coupled to said indicator through a second clutch which couples the indicator to the computor when the aircraft enters the critical approach altitude range on letdown. Means are provided to alter the point of clutch engagement dependent upon the airport altitude and the ambient barometric pressure.

Preferred embodiments of this invention are illustrated in the accompanying drawings of which:

FIGURE 2 is a perspective view of one embodiment of this invention;

FIGURE 5 is a perspective view of another embodiment of this invention;

FIGURE 6 is a view taken along lines 6—6 in FIGURE 5; and

Figure 1:
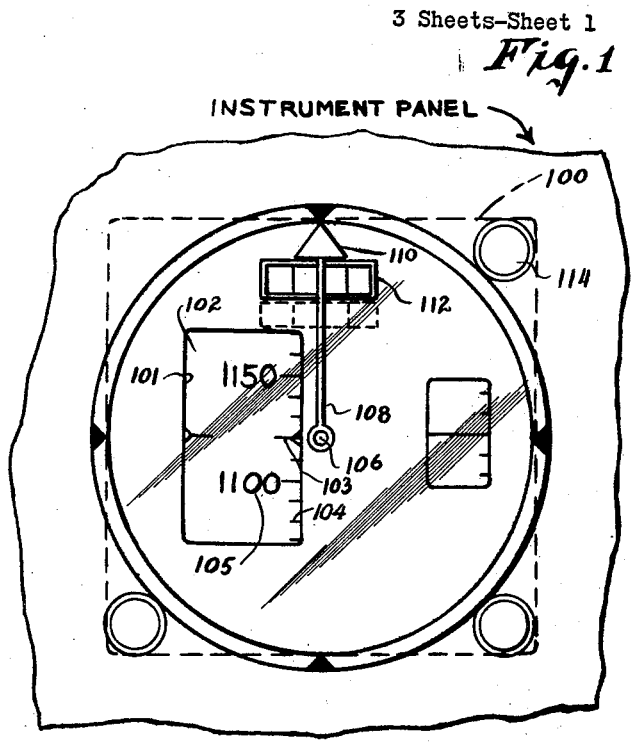
FIGURE 1 is a plan view of a barometric altimeter incorporating the zero reading landing indicator pointer.

In FIGURE 1 there is shown an altimeter incorporating the zero reading landing indicator as an integral component therewith. It will be apparent, particularly in view of the following explanation, that the zero reading indicator may be fabricated as a separate indicator. However, the high instrument density on the control panels of modern aircraft coupled with the identity of the indicator and altimeter drive sources makes it advisable to so combine the instruments. Further, the combined instrument offers certain advantages in explanation of the functional operation of the zero reading landing indicator.

The indicator face plate 100 is provided with a window 101 through which tape 102 is visible. The tape carries a scale 104 imprinted thereon with periodic numerical scale representations 105. The tape is drive past an index line 103 and is positioned sufficiently close thereto to substantially eliminate parallax. For additional details concerning the construction and mode of operation of such an altimeter, reference may be made to application Serial No. 625,211, filed December 3, 1956, for Automatic Indicating and Control Instrument.

Extending through the altimeter face plate is a rotatable shaft 106 to which the zero reading landing indicator pointer 108 is affixed. The pointer is preferably constructed of light weight transparent material such as clear plastic with an opaque arrowhead 110 integrally formed thereon. The arrowhead may be covered with a phosphorescent paint. The pointer is positioned to be illuminated by the edge lighting lamps of the indicator. In cross-country flight the pointer remains stationary and the pilot will observe the aircraft altitude as registered upon the altimeter scale. Although the numerical indication on the altimeter scale is read with no reading ambiguity, it is desirable that the pilot be able to observe his altitude in a time even shorter than that required to focus his eyes upon a numerical representation. Thus, as the aircraft enters the approach phase to an airport, the pointer will start rotating when the aircraft enters the landing approach and will rotate through a single rotation to again reach the vertical position on touchdown.

The zero reading indicator pointer will allow recognition of aircraft altitude in an appreciably shorter time than that required for viewing of a numerical scale. The indicator pointer is a single rotation pointer. That is, it will transverse a single rotation throughout the critical closing altitude range and reach the vertical position upon touchdown of the aircraft. To cover a range encompassing the most critical aspects of aircraft approach during landing, it is preferable that the pointer transcribe a single rotation corresponding to aircraft altitude variation within a thousand feet altitude range above the airport runway for present aircraft. It is within this last 1,000 feet that the pilot must be relieved of time consuming tasks in the cockpit to allow the necessary observation externally of the cockpit. It will be noted that a different range may be selected to suit flight conditions and aircraft type within the scope of this invention. While the invention is equally applicable to differing ranges, such as 0–2000 ft. the range of 0–1000 ft. seems most desirable under present flight conditions with presently available aircraft.

Thus, the zero landing indicator pointer will start rotating in the counter clockwise direction when the plane reaches an altitude of 1,000 feet above the ground and will continue this rotation again reaching the vertical position when the aircraft touches the runway. It will be noted that numerals have been omitted around the periphery of the face of the altimeter. Since the angular rotation is proportional to altitude, numerals representing altitude could be spaced about the periphery of the altimeter. However, it has been found, not only that a single rotation pointer can be observed in the shortest observation time, but that the observer can mentally compute the reading without observing peripheral scale numerals. This fact has been utilized by watch and clock manufacturers who often omit numerals from the face of watches without confusion to the observer.

Since it is desirable that the instrument be capable of aiding the pilot during approach to airports having different field elevations and during varying ambient barometric pressure there is provided means for setting into the instrument information based on such variations. The information set into the instrument is viewed through a window 112 as the setting is manually made by operation of knob 114. Having once set into the instrument the field conditions, the pilot has no further tasks to perform with respect to the instrument and the zero landing indicator pointer will start its rotation at 1,000 feet above the runway.

The setting observed through the window 112 will vary with flight conditions and the system of flight control employed by the utilizing operator. In the event that sea level altimeter setting flight operation is controlling, the absolute altitude of the field will be set into the indicator viewed through window 112 after the barometric altimeter has been corrected to sea level reading by conventional means. If the flight is conducted under pressure altitude conditions (now flown about 15,000 ft. but proposed for flight at all altitudes) the pressure altitude of the field will be set into the indicator viewed through window 112. It will be noted that under pressure altitude flight conditions, the altimeter will either be preset to a standard sea level reading or if sea level correction is provided in the altimeter, the altimeter should be set to the standard sea level reading before the pressure altitude is set into the landing indicator. In the event that pressure altitude flight conditions prevail but the field is equipped only to supply barometric pressure at the field, the reported barometric pressure at the airport will be set into the indicator.

Thus, the instrument setting is made well in advance of approach in accordance with conditions prevailing at the airport as reported to the pilot in normal radio communications. As the pilot begins his letdown, the altimeter will indicate his aircraft altitude and will be observed by the pilot until the aircraft altitude reaches the critical closing range of 1,000 feet above the runway. At this instant, the zero landing indicator pointer will start rotating in a counter clockwise direction at a rate proportional to the letdown velocity. After the indicator starts rotating, the pilot can shorten his observation time during his critical approach phase by merely glancing at the pointer position and recognizing that the pointer position will reach a vertical position at the time of touchdown. The mechanism for driving the pointer over the closing range which is adjustable for variations in field conditions is shown in FIGURE 2.

In FIGURE 2 there is shown the landing indicator pointer 108 with the opaque arrowhead 110 integrally formed thereon. Since the indicator is to indicate altitudes in the most critical flight pattern, the sensor must be accurate within this critical range. An aneroid capsule sensor having the necessary overall accuracy is disclosed in U.S. Patent No. 2,760,260. A sensor drive mechanism, responsive to deflection of the sensor, having the necessary response characteristics is disclosed in application Serial No. 625,211, filed December 3, 1956, for Automatic Indicating and Control Instrument. The sensor drive mechanism in the disclosed instrument employs sensitive aneroid capsules, the deflection of which is proportional to pressure, and a servo follower to drive the scale 104, FIGURE 1 in accordance with such deflection. As noted previously, the sensor drive mechanism could be employed to drive the zero landing indicator if a separate instrument is desirable. However, the identity of the drive and the desirability of decreasing panel instrument density would make it advisable to combine the landing indicator with the altimeter. In either case, rotation of the servo motor shaft 201 is employed to drive the landing indicator.

In those applications where the servo performs the dual function of driving the altimeter scale and driving the landing indicator, it will be apparent that the servo drive will be operable over a far greater range (i.e. zero to 50,000 feet) than is necessary for operation of the landing indicator. However, the landing indicator must be synchronously related to the altimeter scale reading. The range over which the landing indicator must be synchronously driven by the altimeter must encompass all anticipated airport altitudes. For this purpose, a drive range of 0–15,000 ft. for the landing indicator has been chosen.

In order to drive the landing indicator over this range synchronously with the altimeter and to allow independent drive of the altimeter above the selected range, there is provided pinion 202 fixedly coupled to the shaft 201 of the servo motor and engaging gear 203 affixed to threaded shaft 204 supported by the threaded engagement thereof with the tapped hole 206 in frame member 205. As the servo motor rotates, to follow the output signal of the aneroid sensor, gear 203 will be rotated and will also be axially displaced due to the coaction of the threads extending along the periphery of shaft 204 with the internal threads in the hole 206.

In order to couple the landing indicator to the servo drive selectively within the desired operating range there is provided gear 208 threadably engaging shaft 204 by internal threads applied to a centrally located bore 210 therein. The peripheral teeth of gear 208 coact with pinion 212. Since pinion 212 is biased by the action of spring 214 which has one end thereof secured to shaft 216 upon which pinion 212 is mounted and the other end thereof fixedly connected to stop 218, the bias of pinion 212 is of the direction to force pin 220, extending axially from the face of gear 208, into engagement with the stop pin 222.

Thus, in altitudes exceeding the operating altitude of the landing indicator, gear 208 will not rotate but will remain fixed in space. The shaft 204 will move axially as gear 203 is rotated. Since the pitch of the threads in the mounting aperture 206 and the centrally located bore 210 of gear 208 is the same, the gear 208 will remain in the same position with the shaft 204 being moved axially through gear 208. However, when the aircraft enters the operating range of the landing indicator, the coaction of pin 224 extending radially from shaft 204 with the pin 226 extending axially from gear 208 will cause synchronous rotation of gear 208 and gear 203. The bias of spring 214 ensures that gear 208 follows gear 203 during ascent or descent by urging pin 224 into the contact with pin 226.

In this manner there is provided a simple clutch to connect pinion 212 with the servo drive motor through a suitable transmission over a predetermined operating range necessary for the indicator drive. The clutch will disengage pinion 212 when the aircraft altitude exceeds that covered by the necessary range of the landing indicator but the point to which pinion 212 is again coupled to the servo motor is precisely and fixedly determined. Therefore, pinion 212 will be rotated synchronously with aneroid capsule deflection over a predetermined operating range within which the landing indicator is effective. However, since the deflection of aneroid capsules is related to pressure, rotation of pinion 212 is similarly related to pressure. To provide a drive for the landing indicator which is related to altitude, transformation of logarithmic relationship between pressure and altitude must be made. Such transformation is provided in the altimeter by calibration of the scale. However, in a landing indicator it is desired that no scale be applied and that the indication of altitude be given merely by the position of a pointer rotatable through a single revolution with an angular travel proportional to altitude.

For this conversion, there is provided a mechanical computor having an input shaft 216 and an output shaft 234. The rotation of the output shaft bears a logarithmic relationship to the rotation of the input shaft in order to provide a drive suitable for the landing indicator. The computor comprises two reels 228 and 232 rotatably mounted on respective shafts 216 and 234 and interconnected by tape 236 affixed to the hubs thereof.

Figure 3:
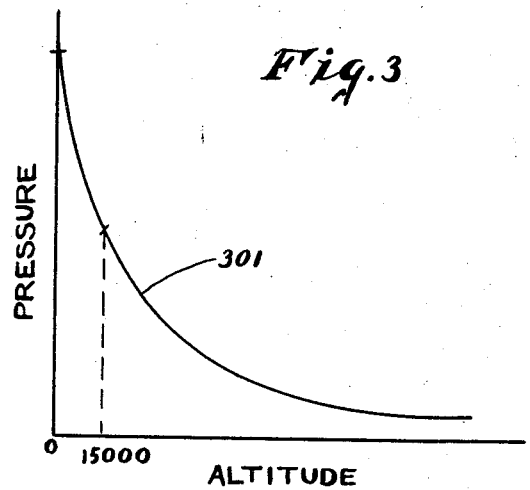
FIGURE 3 is a plot of pressure versus altitude in which pressure is plotted along the scale of ordinates and altitude is plotted along the scale of abscissa.
Figure 4:
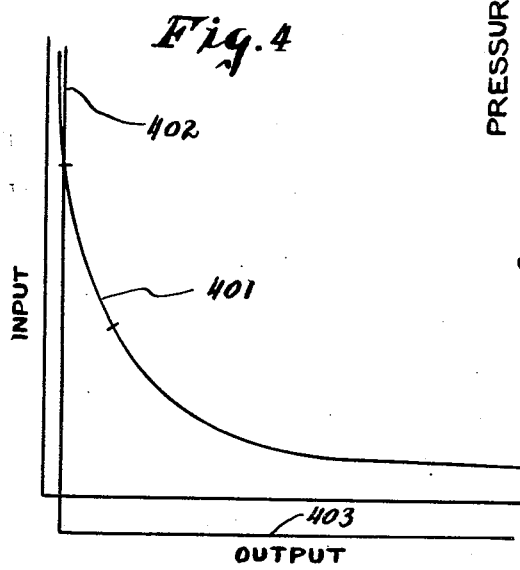
FIGURE 4 is a plot of the characteristics of the mechanical computor in which the input is plotted along the scale of ordinates and the output is plotted along the scale of abscissa and in which the superimposed axes illustrate a shift of the zero point in the mechanical computor.

Operation of the computor to transform a pressure function to an altitude function is best understood by reference to FIGURES 3 and 4.

In FIGURE 3 there is shown a plot of altitude as a function of barometric pressure. In the necessarily idealized form the curve 301 will follow an essentially logarithmic function. Indicated upon the altitude axis is a 15,000 foot altitude. As can be recognized, the curve 301 extending between the zero altitude axis and the 15,000 foot elevation (the desired range of drive of the landing indicator) is but a small portion of the total logarithmic curve.

In FIGURE 4 there is shown a plot of the rotation of the reel 228 as a function of the rotation of reel 232. Since the reels 228 and 230 are coupled by a tape of predetermined thickness affixed to the hubs of the respective reels, the speed ratio therebetween will be a continuously variable one as the effective hub diameter of one reel changes due to build up of tape on the hub and corresponding decrease in hub effective diameter of the other reel due to removal of tape from the hub. With the same hub diameters, the curve 401 will be a symmetrical hyperbolic function. However, it is possible to approximate a logarithmic curve over a predetermined short interval by a hyperbolic function by shifting the effective axis of the hyperbolic function and careful selection of the end points of the interval curve. Shift of the axis to the position indicated by the coordinate axis 402, 403 will make the remaining curve 401 closely approximate the logarithmic curve between zero and 15,000 ft. altitude. Shift of the axis can be easily accomplished by such means as changing of the hub diameter.

Thus, referring back to FIGURE 2, it is seen that the computor provides rotation of an output shaft 232 which is related to the logarithmic function of the rotation of the input shaft 216. Thus, rotation of shaft 234 and the pinion 238 affixed thereto will be related continuously to variation of aircraft altitude over the predetermined range, in the example given, zero to 15,000 feet.

To provide the necessary sensitivity of the indicator and to provide an indicator without ambiguity, only a small portion of the flight range is to be represented by indicator movement. This range is selected as the range of zero–1,000 ft. which is the most critical range of flight operation. To indicate altitude with this critical range without ambiguity, the pointer 108 is desirably a single rotation pointer. Thus, the pointer 108 must remain vertical until the 1,000 ft. altitude has been reached by the aircraft at which time it must be coupled to pinion 238, to reflect rotation thereof in indicator movement. The coupling comprises gear 240, the peripheral teeth of which are enmeshed with the teeth on pinion 238. Gear 240 is bounded about a shaft 242 carrying a radially extending pin 244. An axially extending stop pin 246 is provided on shaft 248 to interact with pin 244 and couple shaft 242 to 248 at a predetermined angular position therebetween. Thus, shaft 248 is rotated synchronously with altitude in the range 0–1,000 feet and is suitable for driving of the indicator pointer. For reasons which will be explained subsequently, the shaft 248 is coupled to the pointer through a differential comprising spur gears 254 and 252 interconnected by a spider gear 256. Affixed to spur gear 254 is shaft 264 which carries gear 250. Thus, as shaft 248 is rotated, gear 250 is similarly rotated, and the pointer is rotated through the co-operation of the peripheral teeth thereon with the teeth on pinion 252 affixed to the pointer shaft 106.

In order to hold the pointer in the vertical position during the period of time when it is inoperative and to ensure that the pointer follows rotation of shaft 242 accurately, there is provided a biasing spring 260 having one end thereof affixed to stop 262 and having the other end affixed to shaft 264. The spring bias urges pin 266 axially extending from the gear 250 against stop pin 268 on frame member 270 during the period when the pointer is stationary and urges pin 246 against pin 244 when the pointer is moving.

Since it will be necessary to change the operation point of the coupling means between the pointer and gear 240 to compensate for variation in field elevation, there is provided a gear 274 manually rotatable by rotation of knurled setting knob 114 on common shaft 278. When the pilot rotates the setting knob, the shaft 278 will cause rotation of gear 274 and gear 279 enmeshed therewith. Gear 279 carries shaft 258 upon which spider gear 256 is rotatably mounted. Thus, as knob 114 is rotated, shaft 248 will be rotated to vary the relative rotational positioning between pin 244 and stop pin 246. This relative rotation between shaft 248 and shaft 242 will vary the altitude at which the clutch will engage to initiate rotation of the landing pointer.

To synchronize the manually adjustable coupling position with field elevations and ambient barometric pressure, there is provided a bevel gear 280 carried upon shaft 278 which coacts with the enmeshed bevel gear 282 to drive shaft 284. Rotation of shaft 284 will change the indicating numerals in a 4-drum indicating counter 286, comprising drums 287, 288, 289 and 290.

For example, in the event that the pressure altitude conditions apply to the flight, the pilot merely rotates knob 114 until the counter reads the reported field pressure elevation. By setting in field pressure elevation into the indicating counter 286, the drive coupling point will be precisely set so that the pointer will start rotating when the aircraft is 1,000 ft. above the airport and will proceed in a single revolution reaching the vertical position when the aircraft is at touchdown. If the altimeter is "corrected" to a sea level reference, the altitude of the field above this sea level reference would be set into the counter.

Thus, the pilot is provided with an indicator which can be easily and quickly observed. Further, after setting the indicator to reflect the airport altitude and ambient barometric pressure, he need not adjust the indicator during final approach. Although a pressure altitude flight pattern has been suggested, it has not been universally adopted at the present time. In those cases where it is anticipated that the airport is equipped to report only the airport barometric pressure, there is provided a second indicator to indicate the correction applied to the indicator. This indicator 291 similarly comprises a 4-drum counter having drum 292-295. However, as explained in connection with the explanation of the computor, there is a logarithmic relationship between barometric pressure and altitude. Since the manual setting adjusts the coupling position of the drive which is driven responsively to altitude, a conversion unit must be provided to enable manual setting of a pressure correction value. For this purpose, there is provided a computor comprising reels 296 and 297 interconnected by tape 298 wound thereon. The operation of the computer in transforming altitude units to pressure units is identical with that explained in connection with the explanation of the computor and needs no further elaboration. The indicator 291 may be viewed through window 112 in place of indicator 280 or a separate window may be provided when both indicators are to be viewed.

Figure 7:
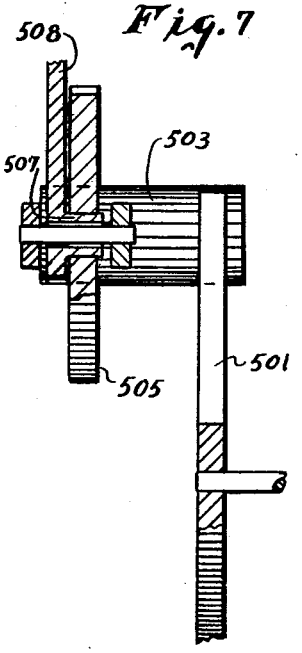
FIGURE 7 is an enlarged cross sectional view taken along lines 7—7 of FIGURE 5.

While the computor comprising reels joined by tape are entirely satisfactory, it is not a positive engagement computor. That is, under some circumstances it may be possible, though not foreseeable in ordinary usage, to rotate one drum with respect to the other. In such cases there may be a lag in indication. In the applications where positive engagement is desirous, the embodiment shown in FIGURES 5 to 7 may advantageously be employed.

In FIGURE 5 there is shown the gear 202 driven by the shaft 201 of the servo motor. The limited range coupling to drive gear 212 over a first predetermined range (e.g. 0-15,000 ft.) is similar to that explained in connection with the operation of FIGURE 2 and will not be repeated here. Affixed to shaft 216 of gear 212 is a helical gear 501. The gear is a segmented drive gear cut in an approximation to an Archimedes spiral with teeth peripherally applied thereto. A follower gear 502 is cut to be a mirror image of gear 501. A slight deviation from a true Archimedes spiral is necessary since the gear teeth are applied with a fixed pitch for enmeshing and since it is necessary that the change in radius to the enmeshed teeth be equal and opposite as the gears rotate. It will be noted that the drive gear 501 and the follower 502 could be directly engaged to give the necessary approximation to a logarithmic relationship between rotation of the input and output shafts 216 and 509 respectively. However, direct engagement would make a rather bulky assembly undesirable in altimeter application. Therefore, there is provided an interconnecting gear train comprising gear 503 engaging gear 501 and gear 504 engaging gear 502. An idler gear 505 extends between and engages gears 504 and 503. Since the diameters of the gears vary as they rotate, means must be provided for movement of gears 504 and 503 to maintain engagement thereof. Gears 503 and 504 are mounted on a bridge 506 pivotably rotatable about bearing 507 on hanger 508. Since the radius of gear 501 increases the same amount as the radius of gear 502 decreases during related rotation, the bridge will merely rock back and forth maintaining engagement of the enmeshed gears. Thus, the rotation of the output shaft 509 is related to the change in altitude of the utilizing aircraft. The pointer is coupled into the output shaft of the computor through co-action of pins 510 and 511 in manner identical to that explained in connection with FIGURE 2.

It will be understood that this invention may be variously embodied and modified within the scope of the subjoined claims.

What is claimed is:

1. A landing indicator for use with an altimeter having sensor means and an altitude display indicator moved over the entire altimeter range in response to movement of said sensor means with changes of altitude, comprising a rotatably mounted pointer superimposed on said altitude display indicator, clutch means to couple said pointer to said sensor means to rotate said pointer through a single rotation from an index position during which rotation the angular displacement of the pointer is linearly related to movement of said sensor means throughout an altitude increment, said altitude increment being a small portion of the altimeter range, and spring means to hold said pointer stationary at said index position at altitudes outside of said altitude increment.

2. A landing indicator according to claim 1 which includes means for selecting the altitude at which said clutch means couples said pointer to said sensor means.

3. A landing indicator for use with an altitude measuring instrument having a sensor deflectable linearly with pressure and a servo drive to position an indicator in response to sensor deflection, comprising computor means to generate an output which is a logarithmic function of the input, clutch means coupling said servo drive to said computor means input over a first predetermined altitude range, a single rotation pointer, means coupling the output of said computor to said pointer to drive said pointer through a single rotation during which the angular position of the pointer is related to altitude within a second predetermined altitude range, and means to hold the pointer stationary at an index position at altitudes outside of said second predetermined altitude range.

4. A landing indicator in accordance with claim 3 which includes means for manually changing the altitude at which said coupling means is effective so that said pointer is at said index position when said indicator is on the ground.

5. A landing indicator in accordance with claim 4 which includes an altitude indicating counter coupled to said manual changing means.

6. A landing indicator in accordance with claim 4 which includes a pressure indication counter, a second computer means to generate an output which is a logarithmic function of the input, means coupling the input of said second computer means to said manual changing means, and means coupling said counter to the output of said second computer means.

7. A landing indicator for use with an altitude measuring instrument having a sensor deflectable linearly with pressure and a servo drive to position an indicator in response to sensor deflection, comprising a threaded shaft rotatably driven by said servo drive, said threaded shaft threadably engaging a fixed mounting to move axially in response to rotation thereof, computor means having an input and output shaft, said computor adapted to rotate the output shaft with a logarithmic relationship to rotation of said input shaft, clutch means carried by said threaded shaft and coupled to said computor input shaft to rotatably drive said input shaft only over a first predetermined range of altitude, a single rotation pointer rotatably mounted on a drive shaft, coupling means associated with the output shaft of said computor and said pointer shaft for coupling said shaft for conjoint rotation over a second predetermined altitude range from the ground, and means for holding said pointer stationary at an index position when said indicator is outside of said second predetermined altitude range.

References Cited in the file of this patent

UNITED STATES PATENTS

| | | |
|---|---|---|
| 1,848,053 | Bacon | Mar. 1, 1932 |
| 2,208,728 | Menzer | July 23, 1940 |
| 2,922,313 | Penny | Jan. 26, 1960 |